(12) United States Patent
Torita et al.

(10) Patent No.: US 11,641,017 B2
(45) Date of Patent: May 2, 2023

(54) NON-AQUEOUS ELECTROLYTE SECONDARY BATTERY HAVING AN INTERMEDIATE LAYER COMPRISING METAL-COVERED MICROCAPSULES

(71) Applicant: Toyota Jidosha Kabushiki Kaisha, Toyota (JP)

(72) Inventors: Koji Torita, Nagoya (JP); Yuji Yokoyama, Kobe (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 16/710,583

(22) Filed: Dec. 11, 2019

(65) Prior Publication Data

US 2020/0194795 A1 Jun. 18, 2020

(30) Foreign Application Priority Data

Dec. 13, 2018 (JP) .............................. JP2018-233409

(51) Int. Cl.
*H01M 4/66* (2006.01)
*H01M 4/76* (2006.01)

(52) U.S. Cl.
CPC ........... *H01M 4/661* (2013.01); *H01M 4/668* (2013.01); *H01M 4/76* (2013.01)

(58) Field of Classification Search
CPC ........ H01M 4/661; H01M 4/76; H01M 4/668; H01M 50/578; H01M 10/4235; H01M 4/13; H01M 4/667; H01M 10/05; H01M 2200/20; Y02E 60/10
See application file for complete search history.

(56) References Cited

U.S. PATENT DOCUMENTS

| 2011/0070501 A1* | 3/2011 | Chang ................... H01M 4/624 |
| | | 429/232 |
| 2015/0280241 A1* | 10/2015 | Hara ..................... H01M 4/661 |
| | | 429/233 |

FOREIGN PATENT DOCUMENTS

| CN | 108091825 A | * | 5/2018 | ........ H01M 10/0525 |
| JP | 4727021 B2 | | 7/2011 | |
| JP | 4929540 B2 | | 5/2012 | |
| JP | 2015-088370 A | | 5/2015 | |
| JP | 2015-111530 A | | 6/2015 | |
| KR | 20100116141 A | | 10/2010 | |
| KR | 20140070139 A | * | 6/2014 | .............. B01J 13/02 |

(Continued)

OTHER PUBLICATIONS

Machine translation of KR 20150067035, Fukuchi et al., 2015 (Year: 2015).*

(Continued)

*Primary Examiner* — Kwang Han
(74) *Attorney, Agent, or Firm* — Dinsmore & Shohl LLP

(57) ABSTRACT

A non-aqueous electrolyte secondary battery includes an electrode current collector, an intermediate layer, and an electrode active material layer. The intermediate layer is interposed between the electrode current collector and the electrode active material layer. The intermediate layer contains a metal-covered microcapsule. The metal-covered microcapsule includes a microcapsule and a metal film. The microcapsule includes a core and a shell. The shell surrounds the core. The core includes a volatile material. The shell includes a thermoplastic resin material. The metal film covers at least part of an outer surface of the microcapsule.

13 Claims, 3 Drawing Sheets

(56) References Cited

FOREIGN PATENT DOCUMENTS

| KR | 20150067035 | * | 6/2015 | .......... H01M 10/052 |
| WO | 2014050653 A1 | | 4/2014 | |

OTHER PUBLICATIONS

Machine translation of KR 20140070139A, Kim et al., 2014 (Year: 2014).*

Machine translation of CN 108091825A, Shi et al., 2018 (Year: 2018).*

* cited by examiner

NON-AQUEOUS ELECTROLYTE SECONDARY BATTERY HAVING AN INTERMEDIATE LAYER COMPRISING METAL-COVERED MICROCAPSULES

CROSS REFERENCE TO RELATED APPLICATIONS

This nonprovisional application claims priority to Japanese Patent Application No, 2018-233409 filed on Dec. 13, 2018, with the Japan Patent Office, the entire contents of which are hereby incorporated by reference.

BACKGROUND

Field

The present disclosure relates to a non-aqueous electrolyte secondary battery.

Description of the Background Art

Japanese Patent Laying-Open No. 2015-088370 discloses a positive electrode that includes a stack of a positive electrode current collector, a first positive electrode layer containing a conductive material and a thermally expandable microcapsule, and a second positive elect ode layer consisting of a positive electrode active material, a conductive material, and a binder, stacked in this order.

SUMMARY

There is a demand for mitigating a rise in temperature of a non-aqueous electrolyte secondary battery (which may be simply called "battery" hereinafter) from occurring upon an external input. The "external input" refers to an abnormal condition of a battery in which a sharp conductive object passes through the housing of the battery and enters inside the battery. The external input is simulated by a "nail penetration test", for example.

When an external input is applied and a sharp object enters inside the battery thereby, a short circuit may occur between a positive electrode and a negative electrode to cause a flow of a short-circuit current. The short-circuit current generates Joule heat. The greater the short-circuit current is, the greater the temperature rise may be.

A rise in temperature occurring upon an external input may be mitigated by interposing an intermediate layer containing a thermally expandable microcapsule between an electrode current collector and an electrode active material layer. The thermally expandable microcapsule expands to a great extent when heated. When an external input occurs and thereby the thermally expandable microcapsule expands to a great extent, the electrical resistance of the intermediate layer may increase rapidly. This may decrease the short-circuit current. The decrease in the short-circuit current may mitigate a rise in temperature.

Typically, a thermally expandable microcapsule is not conductive. Therefore, interposing an intermediate layer containing a thermally expandable microcapsule may increase electrical resistance during normal use. However, it is desirable to have the electrical resistance be low during normal use. In order to lower the electrical resistance during normal use, a conductive material may be added to the intermediate layer. The conductive material may be a carbon material such as acetylene black (AB) for example. The conductive material may form an electron conduction path between the electrode current collector and the electrode active material layer.

As the thermally expandable microcapsule expands upon an external input, the conductive material (carbon material) may move. This movement may interfere with sufficient cutting of electron conduction paths and thereby cause an increase in short-circuit current. Therefore, it may be difficult to make the intermediate layer containing, a thermally expandable microcapsule and a conductive material have both a low electrical resistance during normal use and a high electrical resistance at the time of an external input.

An object of the present disclosure is to obtain both a lose electrical resistance during normal use and a high electrical resistance at the time of an external input.

In the following, the technical structure and the effects according to the present disclosure are described. It should be noted that the action mechanism according to the present disclosure includes presumption. Therefore, the scope of claims should not be limited by whether or not the action mechanism is correct.

[1] A non-aqueous electrolyte secondary battery includes an electrode current collector, an intermediate layer, and an electrode active material layer. The intermediate layer is interposed between the electrode current collector and the electrode active material layer. The intermediate layer contains a metal-covered microcapsule. The metal-covered microcapsule includes a microcapsule and a metal film. The microcapsule includes a core and a shell. The shell surrounds the core. The core includes a volatile material. The shell includes a thermoplastic resin material. The metal film covers at least part of an outer surface of the microcapsule.

The microcapsule included in the metal-covered microcapsule according to the present disclosure is a so-called thermally expandable microcapsule. The metal film covers at least part of an outer surface of the microcapsule. The metal film may form an electron conduction path. The metal film may decrease electrical resistance during normal use.

In the intermediate layer according to the present disclosure, expansion of the microcapsule upon an external input may break the metal film that is the on a surface of the microcapsule. When the metal film breaks, an electron conduction path may be cut. This may increase electrical resistance at the time of an external input.

As discussed above, the battery according to the present disclosure may have both a low electrical resistance during normal use and a high electrical resistance at the tone of an external input.

[2] The microcapsule may have an average particle size of 15 μm or smaller, for example. This may increase electrical resistance at the time of an external input.

[3] The ratio of the average, particle size of the microcapsule to the average thickness of the metal film may be 100 or lower, for example. This may decrease electrical resistance during normal use.

The foregoing and other objects, features, aspects and advantages of the present disclosure will become more apparent from the following detailed description of the present disclosure when taken in conjunction with the accompanying drawings.

DETAILED DESCRIPTION

In the following, embodiments according to the present disclosure (herein called "present embodiment") are described. However, the description below does not limit the scope of claims.

For instance, the present embodiment involves an intermediate layer that is included in a positive electrode. However, this is merely an example. The intermediate layer may be included in a negative electrode.

For instance, the present embodiment involves a battery that is a laminate-type battery. However, this is merely an example. The battery may be a prismatic battery or may be a cylindrical battery.

For instance, the present embodiment involves an electrode group that is a stack-type one. However, this is merely an example. The electrode group may be a wound-type one.

For instance, the present embodiment involves use of an electrolyte solution. However, this is merely an example. A gelled electrolyte may be used, or a solid electrolyte may be used. In other words, the battery may be a polymer battery or may be an all-solid-state battery.

<Non-Aqueous Electrolyte Secondary Battery>

Figure 1:
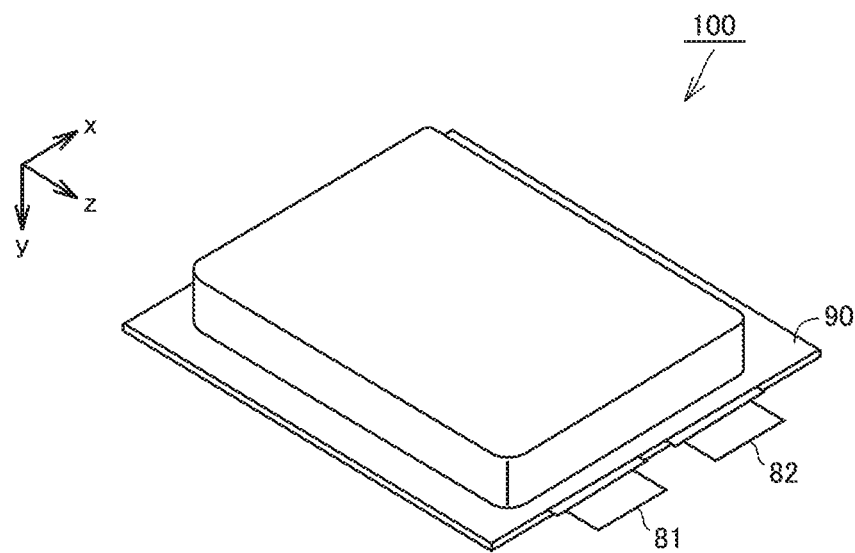
FIG. 1 is a first schematic view illustrating an example configuration of the non-aqueous electrolyte secondary battery according to the present embodiment.

FIG. 1 is a first schematic view illustrating an example configuration of a non-aqueous electrolyte secondary battery according to the present embodiment.

A battery 100 is a laminate-type battery. Battery 100 includes a casing 90. Casing 90 is a pouch made of an aluminum-laminated film. Casing 90 is hermetically sealed. A positive electrode tab 81 and a negative electrode tab 82 are provided to allow for communication between inside and outside easing 90.

Figure 2:
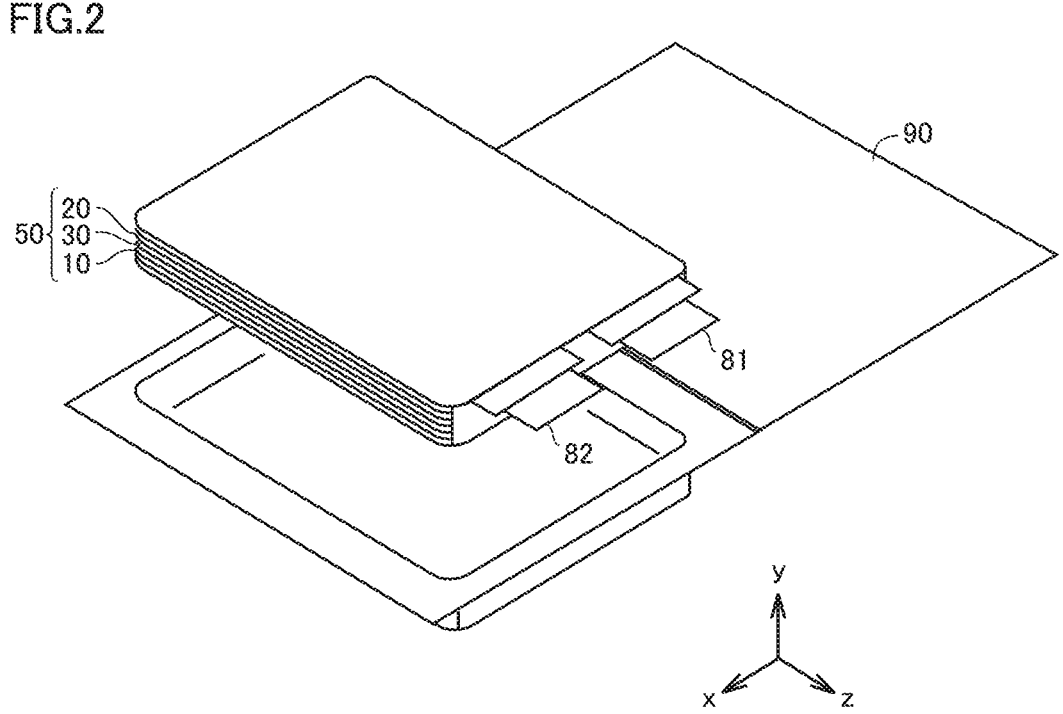
FIG. 2 is a second schematic view illustrating, an example configuration of the non-aqueous electrolyte secondary battery according to the present embodiment.

FIG. 2 is a second schematic view illustrating an example configuration of the non-aqueous electrolyte secondary battery according to the present embodiment.

Casing 90 accommodates an electrode group 50 and an electrolyte solution (not shown). Electrode group 50 is a stack-type one. Electrode group 50 includes a positive electrode 10, a separator 30, and a negative electrode 20. For instance, each of positive electrode 10, separator 30, and negative electrode 20 may be flat and in cut-sheet paper form.

Electrode group 50 is formed by alternately stacking one positive electrode 10 and one negative electrode 20 and then repeating this alternate stacking process more than once. In each space between positive electrode 10 and negative electrode 20, separator 30 is interposed. Each positive electrode 10 is electrically connected to positive electrode tab 81. Each negative electrode 20 is electrically connected to negative electrode tab 82.

<Positive Electrode>

Figure 3:
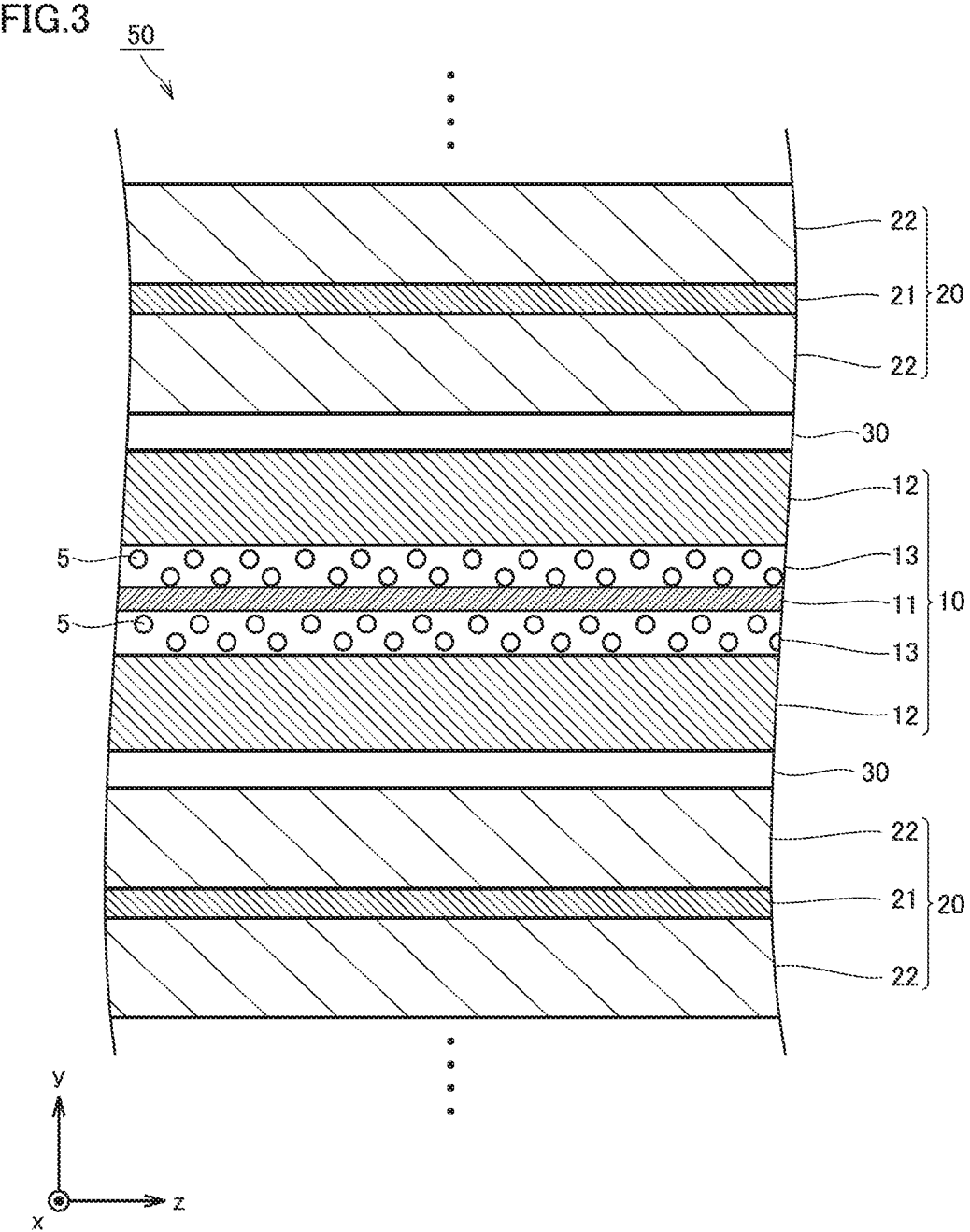
FIG. 3 is a schematic sectional view illustrating an example configuration of an electrode group according to the present embodiment.

FIG. 3 is a schematic sectional view illustrating an example configuration of the electrode group according to the present embodiment.

Positive electrode 10 is a sheet-form part. Positive electrode 10 includes a positive electrode current collector 11, an intermediate layer 13, and a positive electrode active material layer 12. In other words, battery 100 according to the present embodiment includes an electrode current collector, intermediate layer 13, and an electrode active material layer. Intermediate layer 13 and positive electrode active material layer 12 may be disposed on only one side of positive electrode current collector 11. Intermediate layer 13 and positive electrode active material layer 12 may be disposed on both sides of positive electrode current collector 11.

<<Positive Electrode Current Collector>>

Positive electrode current collector 11 is a conductive electrode substrate. Positive electrode current collector 11 may have a thickness ranging from 5 µm to 50 µm, for example. Positive electrode current collector 11 may be an aluminum (Al) foil, for example.

<<Intermediate Layer>>

Intermediate layer 13 is interposed between positive electrode current collector 11 and positive electrode active material layer 12. In other words, intermediate layer 13 is interposed between the electrode current collector and the electrode active material layer. For instance, intermediate layer 13 may be formed by applying a paste containing a metal-covered microcapsule 5 to a surface of positive electrode current collector 11, followed by drying. For instance, intermediate layer 13 may have a thickness ranging from 5 µm to 50 µm.

(Composition)

Intermediate layer 13 contains metal-covered microcapsule 5. For instance, intermediate layer 13 may consist essentially of metal-covered microcapsule 5. For instance, intermediate layer 13 may further contain a binder (not shown). For instance, intermediate layer 13 may consist essentially of metal-covered microcapsule 5 and a binder. For instance, intermediate layer 13 may contain the binder in an amount ranging from 1 mass % to 20 mass % with the remainder being made up of metal-covered microcapsule 5. For instance, intermediate layer 13 may contain the binder in an amount ranging from 5 mass % to 15 mass % with the remainder being made up of metal-covered microcapsule 5.

The binder contained in intermediate layer 13 is not particularly limited. The binder may include at least one selected from the group consisting of polyvinylidene difluoride (PVDF), polytetrafluorgethylene (PTFE), vinylidene difluoride-hexafluoropropylene copolymer (PVDF-HFP), polyacrylic acid (PAA), carboxymethylcellulose (CMC), and styrene-butadiene rubber (SBR), for example.

Intermediate layer 13 may contain no conductive material such as AB. This is because an electron conduction path may be formed on a surface of metal-covered microcapsule 5 in the present embodiment. When intermediate layer 13 contains essentially no conductive material such as AB, electrical resistance at the time of an external input may increase.

(Metal-Covered Microcapsule)

Figure 4:
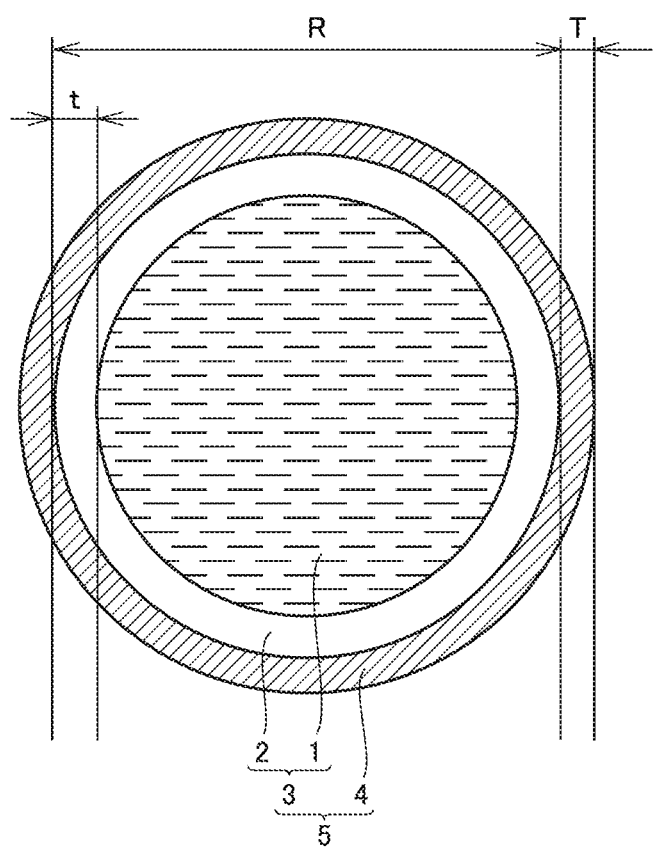
FIG. 4 is a schematic sectional view of the metal-covered microcapsule according to the present embodiment.

FIG. 4 is a schematic sectional view of the metal-covered microcapsule according to the present embodiment.

Metal-covered microcapsule 5 includes a microcapsule 3 and a metal 4.

(Microcapsule)

Microcapsule 3 is a thermally expandable microcapsule. Microcapsule 3 includes a core 1 and a shell 2. Shell 2 surrounds core 1. Core 1 includes a volatile material. Shell 2 includes a thermoplastic resin material. When a predetermined temperature is reached, the volatile material generates gas and the thermoplastic resin material softens. These phenomena may cause microcapsule 3 to expand. For instance, microcapsule 3 may expand 50 to 100 times in volume.

The temperature at which microcapsule 3 starts to expand (also called "activation temperature") may be adjusted by using a different combination of the volatile material and the thermoplastic resin material. For instance, the activation temperature may range, from 70° C. to 135° C. For instance, the activation temperature may minute from 115° C. to 135° C. For instance, the activation temperature may range from 120° C. to 135° C.

For instance, shell 2 may consist essentially of the thermoplastic resin material. For instance, the thermoplastic resin material may have gas barrier properties. For instance, the thermoplastic resin material may be termed by polymerizing at least one monomer selected from the group consisting of acrylonitrile, methacrylonitrile, and polyvinylidene chloride.

For instance, core 1 may consist essentially of the volatile material. For instance, the volatile material may be liquid. For instance, the volatile material may be a hydrocarbon. For instance, the volatile material may include at least one selected from the group consisting of hexane, heptane, and, octane. For instance, the volatile material may include at least one selected from the group consisting of heptane and octane. These liquid hydrocarbons have preferable boiling points.

(Average Particle Size)

In the present embodiment, the average particle size and the like of microcapsule 3 are measured in a cross-sectional micrograph of intermediate layer 13 obtained with a scanning electron microscope (SEM). The cross section may be any cross section.

For instance, the average particle size (R) of microcapsule 3 may be 25 µm or smaller. The particle size of microcapsule 3 refers to the maximum diameter of microcapsule 3 observed in the cross section. The particle size of microcapsule 3 is equivalent to the outer diameter of shell 2. The particle size of the microcapsule is measured for at least ten microcapsules 3. These at least ten microcapsules 3 are selected by random sampling. The "average particle size (R)" according to the present embodiment is the arithmetic mean of these at least ten particle sizes.

When a commercial product is used as uncrocapsule 3, the D50 value found on the specifications and the like is used as the "average particle size (R)". The "D50" refers to a particle size in volume-based particle size distribution at which the cumulative value (accumulated from the side of small sizes) reaches 50%. The D50 is measured with a laser-diffraction/scattering particle size distribution analyzer.

For instance, the average particle size (R) of microcapsule 3 may be 15 µm or smaller. This configuration may increase electrical resistance at the time of an external input. It may be because the smaller the particle size is, the more promptly the expanding behavior is exhibited. For instance, the average particle size (R) of microcapsule 3 may be 9 µm or smaller. The average particle size (R) of microcapsule 3 has no particular lower limit to it. For instance, the average particle size (R) of microcapsule 3 may be 5 µm or greater.

For instance, the film thickness (t) of shell 2 may be 2 µm or greater. This allows room for moderate stretching for shell 2, for example, and may thereby allow a moderate increase in volume upon expansion. The film thickness (t) of shell 2 is determined by subtracting the inner diameter of shell 2 from the outer diameter of shell 2. For instance, the film thickness (t) of shell 2 may be 5 µm or smaller.

(Metal Film)

Metal film 4 forms an electron conduction path. Metal film 4 covers at least part of an outer surface of microcapsule 3 (shell 2). Metal film 4 may cover substantially the entire outer surface of microcapsule 3. Metal film 4 may cover part of an outer surface of microcapsule 3.

Metal film 4 may be formed by vacuum deposition, for example. Vacuum deposition is a technique that is less likely to cause thermal damage to microcapsule 3. Thermal damage, if caused to microcapsule 3 during formation of metal film 1 may affect the expanding behavior of microcapsule 3 that is exhibited upon an external input. The thickness of metal film 4 may be adjusted by changing, for example, the duration of deposition Metal film 4 contains a metal material. Metal film 4 may consist essentially of a metal material. When intermediate layer 13 is included in positive electrode 10, a metal material that does not undergo ionization at an electric potential of the positive electrode during charge is selected. The electric potential of the positive electrode during charge may range from 4.0 V vs. Li/Li$^+$ to 4.5 V vs. Li/Li$^+$, for example. The metal material may include at., least one selected from the group consisting of Al and platinum (Pt), for example.

The average thickness (T) of metal film 4 may be 0.05 µm or greater, for example. The thickness of metal film 4 refers to a thickness of metal film 4 measured in the same direction as that of the film thickness (t) of shell 2. The thickness of metal film 4 is measured at at least ten positions. These at least ten positions are selected by random sampling. The "average thickness (T)" is the arithmetic mean of the thickness measurements at these at least ten positions.

For instance, the average thickness (T) of metal film 4 may be 0.09 µm or greater. For instance, the average thickness (T) of metal film 4 may be 0.2 µm or greater. For instance, the average thickness (T) of metal film 4 may be 0.9 µm or smaller. For instance, the average thickness (T) of metal film 4 may be 0.5 µm or smaller. For instance, the average thickness (T) of metal film 4 may be 0.3 µm or smaller.

(Ratio R/T))

The ratio of the average particle size (R) of microcapsule 3 to the average thickness (T) of metal film 4 (R/T) may be 180 or lower, for example. The ratio (R/T) may be 100 or lower, for example. With the ratio (R/T) being 100 or lower, electrical resistance during normal use may decrease. This may be because the relatively thick metal film 4 makes it easy for electron conduction paths to form. The ratio (R/T) may be 50 or lower, for example.

The ratio (R/T) may be 10 or higher, for example. With the ratio (R/T) being 10 or higher, metal film 4 may readily break upon expansion of microcapsule 3. This may cause a rapid increase in electrical resistance and thereby reduce a short-circuit current. The ratio (R/T) may be 45 or higher, for example.

<<Positive Electrode Active Material Layer>>

Positive electrode active material layer 12 is disposed on a surface of intermediate layer 13. For instance, positive electrode active material layer 12 may be formed by applying a paste containing a positive electrode active material to a surface of intermediate layer 13, followed by drying.

For instance, positive electrode active material layer 12 may have a thickness ranging from 10 µm to 200 µm. Positive electrode active material layer 12 contains at least a positive electrode active material. Positive electrode active material layer 12 may further contain a conductive material, a binder, and the like in addition to the positive electrode active material. For instance, positive electrode active material layer 12 may contain the conductive material in an amount ranging from 0.1 mass % to 20 mass % and the binder in an amount ranging from 0.1 mass % to 10 mass % with the remainder being made up of the positive electrode active material.

For instance, the positive electrode active material may be in the form of particles. For instance, the positive electrode active material may have a D50 ranging from 1 μm to 30 μm. The positive electrode active material is not particularly limited. The positive electrode active material may include at least one selected from the group consisting of lithium cobalt oxide, lithium nickel oxide, lithium manganese oxide, lithium nickel cobalt aluminate (NCA), lithium nickel cobalt manganese oxide (NCM), and lithium iron phosphate, for example.

The conductive material is not particularly limited. The conductive material may include at least one selected from the group consisting of AB, furnace black, Ketjenblack (registered trademark), channel black, thermal black, graphite, soft carbon, hard carbon, vapor grown carbon fiber (VGCF), carbon nanotube (CNT), and graphene flake, for example.

The binder contained in positive electrode active material layer 12 is not particularly limited. The binder may include at least one selected from the group consisting of PVDF, PVDF-HFP, PTFE, and PAA, for example.

<Negative Electrode>

Net electrode 20 is a sheet-form part. Negative electrode 20 includes negative electrode current collector 21 and a negative electrode active material layer 22. Between negative electrode current collector 21 and negative electrode active material layer 22, the above-described intermediate layer 13 may be interposed. In the configuration in which intermediate layer 13 is interposed between negative electrode current collector 21 and negative electrode active material layer 22, both a low electrical resistance during normal use and a high electrical resistance at the time of an external input may also be obtained.

For instance, negative electrode current collector 21 may be made of a copper (Cu) foil. For instance, negative electrode current collector 21 may have a thickness ranging from 5 μm o 50 μm.

Negative electrode active material layer 22 is disposed on a surface of negative electrode current collector 21. Negative electrode active material layer 22 may be disposed on only one side of negative electrode current collector 21. Negative electrode active material layer 22 may be disposed on both sides of negative electrode current collector 21. Negative electrode active material layer 22 may have a thickness ranging from 10 μm to 200 μm. Negative electrode active material layer 22 contains at least a negative electrode active material. Negative electrode active material layer 22 may further contain a binder and the like in addition to the negative ectrode active material. For instance, negative electrode active material layer 22 may contain the binder in an amount ranging from 0.1 mass % to 10 mass% with the remainder being made up of the negative electrode active material.

For instance, the negative electrode active material may be in the form or particles. For instance, the negative electrode active material may have a D50 ranging from 1 μm to 30 μm. The negative electrode active material is not particularly limited. The negative electrode active material may include at least one selected from the group consisting of graphite, salt carbon, hard carbon, amorphous carbon, silicon oxide, silicon, silicon-based alloy, tin oxide, tin, tin-based alloy, and lithium titanium oxide for example.

The binder contained in negative electrode active material layer 22 is not particularly limited. The binder may include at least one selected from the group consisting of CMC, SBR, and PAA, for example.

<Separator>

Separator 30 is interposed between positive electrode 10 and negative electrode 20. Separator 30 is a porous film. Separator 30 is electrically insulating. For instance, separator 30 may have a thickness ranging from 5 μm to 30 μm.

For instance, separator 30 may include polyolefin. For instance, separator 30 may include polyethylene (PE). For instance, separator 30 may include polypropylene (PP).

For instance, separator 30 may have a monolayer structure. For instance, separator 30 may consist essentially of a porous PE layer. For instance, separator 30 may have a multilayer structure. For instance, separator 30 may be formed by stacking a porous PP layer, a porous PE layer, and a porous PP layer in this order.

<Electrolyte Solution>

The electrolyte solution contains a solvent and a supporting salt. The supporting salt is dissolved in the solvent. The concentration of the supporting salt may range from 0.5 mol/L to 2. mol/L (from 0.5 M to 2 M), for example. The supporting salt may include at least one selected from the group consisting of $LiPF_6$, $LiBF_4$, $LiN(FSO_2)_2$, and $LiN(CF_3SO_2)_2$, for example.

The solvent is aprotic. The solvent may contain a cyclic carbonate and a chain carbonate, for example. The mixing ratio of the cyclic carbonate and the chain carbonate may be "(cyclic carbonate)/(chain carbonate)=1/9 to 5/5 (volume ratio)", for example. The cyclic carbonate may include at least one selected from the group consisting of ethylene carbonate (EC), propylene carbonate (PC), butylene carbonate (BC), and fluoroethylene carbonate (FEC), for example.

The chain carbonate may include at least one selected from the group consisting of dimethyl carbonate (DMC), ethyl methyl carbonate (EMC), and diethyl carbonate (DEC), for example.

The solvent may contain a lactone, a cyclic ether, a chain ether, and/or a carboxylate ester for example. The lactone may include γ-butyrolactone (GBL) and/or δ-valerolactone (DVL), for example. The cyclic ether may include tetrahydrofuran (THF), 1,3-dioxolane (DOL), and/or 1,4-dioxane (DX), for example. The chain ether may include 1,2-dimethoxyethane (DME), for example. The carboxylate ester may include methyl formate (MF), methyl acetate (MA), and/or methyl propionate (MP), for example.

The electrolyte solution may further contain various additives in addition to the solvent and the supporting salt. The concentration of the additives may range from 0.005 mol/L to 0.5 mol/L, for example. The additives may include a gas generation agent (so-called "overcharging inhibitor"), a solid electrolyte interface (SEI) film-forming agent, a flame retardant, and/or the like, for example.

The gas generation agent may include cyclohexylbenzene (CHB) and biphenyl (BP), for example. The SEI-film-forming agent may include vinylene carbonate (VC), vinylethylene carbonate (VEC), $LiB(C_2O_4)_2$, $LiBF_2(C_2O_4)$, $LiPF_2(C_2O_4)_2$, $LiPO_2F_2$, propane sultone, and ethylene sulfite (ES), for example. The flame retardant may include phosphazene, for example.

EXAMPLES

Next, examples according to the present disclosure (herein called "present example") are described. However, the description below does not limit the scope of claims.

<Production of Non-Aqueous Electrolyte Secondary Battery>

Example 1

1. Formation of Intermediate Layer

The materials described below were prepared.
Microcapsule: trade name "Matsumoto Microsphere", made "FN-100SS"
Binder: PVDF
Dispersion median: N-methyl-2-pyrrolidone (NMP)
Positive electrode current collector: Al foil (thickness, 20 μm)

Microcapsule 3 of Example 1 had an average particle size (R) of 9 μm. On an outer surface of microcapsule 3, metal film 4 was formed by vacuum deposition. The metal material was Al. The duration of deposition was one hour. Metal film 4 had an average thickness (T) of 0.2 μm. Thus, metal-covered microcapsule 5 was prepared.

Metal-covered microcapsule 5, the binder, and the dispersion medium were mixed, and thereby a paste was prepared. The solid matter mixing ratio was "(metal-covered microcapsule)/binder=9/1 (mass ratio)". In column "Mass ratio" in Table 1 below, the metal-covered microcapsule is abbreviated as "MCMC".

The paste was applied to a surface of positive electrode current collector 11 with a die coater, followed by drying, and thereby intermediate layer 13 was formed. The drying temperature was 70° C. This drying temperature was selected in consideration of the activation temperature of microcapsule 3. Intermediate layer 13 had a thickness of 30 μm.

2. Production of Positive Electrode

The materials described below were prepared.
Positive electrode active material: NCM
Conductive material: AB
Binder: PVDF
Dispersion medium: NMP The positive electrode active material, the conductive material, the binder, and the dispersion medium were mixed, and thereby a paste was prepared. The solid matter mixing ratio was "(positive electrode active material)/(conductive material)/binder=87/10/3 (mass ratio)". The paste was applied to a surface of intermediate layer 13 with a die water, followed by drying, and thereby positive electrode active material layer 12 was formed. In this way, a positive electrode raw sheet was produced. The resulting positive electrode raw sheet was processed into predetermined dimensions, and thereby positive electrode 10 was produced. Positive electrode 10 had a thickness of 100 μm. Positive electrode 10 had planar sizes of 50 min×50 mm.

3. Production of Negative Electrode

The materials described below were prepared.
Negative electrode active material: graphite
Binder: CMC/SBR=1/1 (mass ratio)
Dispersion medium: water
Negative electrode current collector: Cu foil (thickness, 10 μm)

The negative electrode active, material, the binder, and the dispersion medium were mixed, and thereby a paste was prepared. The solid matter mixing ratio was "(negative electrode active material)/binder=98/2 (mass ratio)". The paste was applied to a surface of negative electrode current collector 21 with a die coater, followed by drying, and thereby negative electrode active material layer 22 was formed. In this way, a negative electrode raw sheet was produced. The resulting negative electrode raw sheet was processed into predetermined dimensions, and thereby negative electrode 20 was produced. Negative electrode 20 had a thickness of 80 μm. Negative electrode 20 had planar sizes of 52 mm×52 mm.

4. Assembly

Separator 30 was prepared. Separator 30 had a three-layer structure of (porous PP layer)-(porous PE layer)-(porous PP layer). Separator 30 had a thickness 2.0 μm.

Negative electrode 20, separator 30, positive electrode 10, separator 30, and negative electrode 20 were stacked in this order, and thereby electrode group 50 was formed. To positive electrode 10, positive electrode tab 81 was bonded. To negative electrode 20, negative electrode tab 82 was bonded. Casing 90 was prepared. Casing 90 was a pouch made of an aluminum-laminated film. Electrode group 50 was placed in casing 90.

An electrolyte solution was prepared. The electrolyte solution consisted of components described below.
Solvent: EC/DMC/EMC=1/1/1 (volume ratio)
Supporting salt: $LiPF_6$ (concentration, 1 mol/L)

Into easing 90, the electrolyte solution was injected. Casing 90 was hermetically sealed. In this way, battery 100 was produced. Battery 100 of the present example was designed to have a rated capacity of 0.1 Ah.

Example 2

A microcapsule specified in Table 1 below was prepared. The microcapsule of Example 2 had an average particle size (R) of 15 μm. On an outer surface of the microcapsule, a metal film was formed by vacuum deposition. The metal material was Al. The duration of deposition was 1.5 hours. The metal film had an average thickness (T) of 0.3 μm. In this way, a metal-covered microcapsule was prepared. Except these conditions, the same manner as in Example 1 was adopted to produce a battery.

Example 3

A microcapsule specified in Table 1 below was prepared. The microcapsule of Example 3 had an average particle size (R) of 25 μm. On an outer surface of the microcapsule, a metal film was formed by vacuum deposition. The metal material was Al. The duration of deposition was 2.5 hours. The metal film had an average thickness (T) of 0.5 μm. In this way, a metal-covered microcapsule was prepared. Except these conditions, the same manner as in Example 1 was adopted to produce a battery.

Example 4

A microcapsule specified in Table 1 below was prepared. The microcapsule of Example 4 had an average particle size (R) of 9 μm. On an outer surface of the microcapsule, a metal film was fanned by vacuum deposition. The metal material was Al. The duration of deposition was 4.5 hours. The metal film had an average thickness (T) of 0.9 μm. In this way, a metal-covered microcapsule was prepared. Except these conditions, the same manner as in Example 1 was adopted to produce a battery.

Example 5

A microcapsule specified in Table 1 below was prepared. The microcapsule of Example 5 had an average particle size (R) of 9 μm. On an outer surface of the microcapsule, a metal film was formed by vacuum deposition. The metal material was Al. The duration of deposition was 0.5 hours. The metal film had an average thickness (T) of 0.09 μm. In this way, a metal-covered microcapsule was prepared. Except these conditions, the same manner as in Example 1 was adopted to produce a battery.

Example 6

A microcapsule specified in Table 1 below was prepared. The microcapsule of Example 6 had an average particle size (R) of 9 μm. On an outer surface of the microcapsule, a metal film was formed by vacuum deposition. The metal material was Al. The duration of deposition was 0.25 hours. The metal film had an average thickness (T) of 0.05 μm. In this way, a metal-covered microcapsule was prepared. Except these conditions, the same manner as in Example 1 was adopted to produce a battery.

Example 7

A battery was produced in the same manner as in Example 1 except that Pt, instead of Al, was used as a metal material of a metal film.

Comparative Example 1

The microcapsule, the conductive material (AB), the binder, and the dispersion medium were mixed, and thereby a paste was prepared. The solid matter mixing ratio was "microcapsule/(conductive material)/binder=6/3/1 (mass ratio)". In column "Mass ratio" in Table 1 below, the microcapsule is abbreviated as "MC". Except these conditions, the same manner as in Example 1 was adopted to produce a battery. In Comparative Example 1, no metal film was formed on an outer surface of the microcapsule. In Comparative Example 1 a conductive material (AB) was added to the intermediate layer.

Comparative Example 2

The microcapsule, the binder, and the dispersion medium were mixed, and thereby a paste was prepared. The solid matter mixing ratio was "microcapsule/binder=9/1 (mass ratio)". Except these conditions, the same manner as in Example 1 was adopted to produce a battery. In Comparative Example 2, no metal film was formed on an outer surface of the microcapsule.

Comparative Example 3

The positive electrode active material, the conductive material, the binder, the microcapsule, and the dispersion medium were mixed, and thereby a paste was prepared. The solid matter mixing ratio was "(positive electrode active material)/(conductive material)/binder/microcapsule=88/1/1/10 (mass ratio)". The paste was directly applied to a surface of the positive electrode current collector with a die coater, followed by drying, and thereby a positive electrode active material layer was formed. Except these conditions, the same manner as in Example 1 was adopted to produce a battery. In Comparative Example 3, no intermediate layer was formed. In Comparative Example 3, the microcapsule was added to the positive electrode active material layer.

<Evaluation>

<<Penetration Resistance>>

Positive electrode current collector 11 was cut to prepare specimens. Each specimen had planar sizes of 50 mm×50 mm. Two spedmens were stacked on top of one another. These two specimens were restrained with a force 100 kgf. An electric current was passed through these two restrained specimens in a direction from one specimen to the other, and the electrical resistance during the passage was measured with a tester. In the context of the present example, this electrical resistance is called "penetration resistance". The penetration resistance was measured before and after formation of intermediate layer 13. The increment in penetration resistance observed after the formation of intermediate layer 13 may be regarded as the electrical resistance of intermediate layer 13. After the formation of intermediate layer 13, positive electrode current collector 11 was left in a thermostatic chamber at 150° C. for 10 minutes, followed by another measurement of penetration resistance. The penetration resistance measured after being left at 150° C. (after 150° C. heating) may be regarded as the electrical resistance of intermediate layer 13 at the time of expansion of microcapsule 3. Results are shown in Table 1 below.

<<Battery Resistance>>

The voltage of the battery was adjusted to 3.7 V. In an environment at a temperature of 25° C. (in an environment at normal temperature), the battery was discharged at a current of 1 A for ten seconds. The level of voltage drop caused in the ten seconds elapsed after the start of the discharging was measured. The resulting value of the level of voltage drop was divided by the amount of the discharge current (1 A), and thus the battery resistance was calculated. Results are shown in Table 1 below.

<<Nail Penetration Test>>

The battery was charged to 4.1 V at a current of 0.1 A. A nail was prepared. The nail had a shank diameter of 3 mm. The nail was driven into the battery at a rate of 1 mm/sec. Twenty seconds after the nail was driven, the temperature of a side surface of the battery was measured. Results are shown in Table 1 below.

In the context of the present example, an example in which the battery resistance at normal temperature was "890 mΩ or lower" and the temperature measured after 20 seconds in the nail penetration test was "132° C. or lower" is regarded as having both a low electrical resistance during normal use and a high electrical resistance at the time of an external input.

TABLE 1

| | Intermediate layer (thickness, 30 μm) | | | | | Evaluation | | | | |
|---|---|---|---|---|---|---|---|---|---|---|
| | Metal-covered microcapsule (MCMC) | | | | | Electrode current collector (Al foil (thickness, 20 μm)) Penetration resistance | | | | Nail penetration test |
| | Microcapsule (MC), Trade name: Matsumoto | | | | | | | | | |
| | Microsphere | | Metal film | | | Before | After | | Battery | Temp. |
| | Grade | Average particle size (R) /μm | Metal material | Average thickness (T) /μm | Ratio (R/T) /— | Composition Mass ratio | intermediate layer formation /mΩ | intermediate layer formation /mΩ | After 150° C. heating /mΩ | resistance Normal temp. /mΩ | measured after 20 seconds /° C. |
| Comp. Ex. 1 | FN-100ss | 9 | *1 | — | — | MC/AB/PVDF = 6/3/1 | 12 | 130 | 329 | 781 | 150 |
| Comp. Ex. 2 | FN-100ss | 9 | *1 | — | — | MC/PVDF = 9/1 | 12 | 1560 | 4892 | 1502 | 35 |
| Comp. Ex. 3 | FN-100ss | 9 | *1 | — | — | *2 | 12 | — | — | 590 | 141 |
| Ex. 1 | FN-100ss | 9 | Al | 0.2 | 45 | MCMC/PVDF = 9/1 | 12 | 62 | 4702 | 565 | 34 |
| Ex. 2 | FN-100s | 15 | Al | 0.3 | 50 | MCMC/PVDF = 9/1 | 12 | 79 | 4587 | 589 | 36 |
| Ex. 3 | FN-100M | 25 | Al | 0.5 | 50 | MCMC/PVDF = 9/1 | 12 | 91 | 721 | 601 | 132 |
| Ex. 4 | FN-100ss | 9 | Al | 0.9 | 10 | MCMC/PVDF = 9/1 | 12 | 45 | 3998 | 540 | 45 |
| Ex. 5 | FN-100ss | 9 | Al | 0.09 | 100 | MCMC/PVDF = 9/1 | 12 | 99 | 5383 | 621 | 30 |
| Ex. 6 | FN-100ss | 9 | Al | 0.05 | 180 | MCMC/PVDF = 9/1 | 12 | 598 | 5832 | 890 | 30 |
| Ex. 7 | FN-100ss | 9 | Pt | 0.2 | 45 | MCMC/PVDF = 9/1 | 12 | 99 | 5001 | 560 | 34 |

*1: In Comparative Examples 1 to 3, no metal film was formed. The microcapsule was used as it was.
*2: In Comparative Example 3, no intermediate layer was formed.
In Comparative Example 3, the microcapsule was added to the positive electrode active material layer.

<Results>

Comparative Examples 1 to 3

In Comparative Example 1, the temperature measured after 20 seconds was high. It is considered that the electrical resistance at the time of an external input was low in Comparative Example 1. In Comparative Example 1, the intermediate layer contained a conductive material (AB). It is considered that the conductive material was able to move along with the expansion of the microcapsule and thereby the electron conduction path was not sufficiently cut.

In Comparative Example 2, the battery resistance was high. It is considered that the electrical resistance during normal use was high in Comparative Example 2. It is considered that when the microcapsule is not conductive, and thereby the conductive component is present, electrical resistance increases.

In Comparative Example 3, the temperature measured after 20 seconds was high. In Comparative Example 3, no intermediate layer was formed and the positive electrode active material layer contained a microcapsule. It is considered that a short-circuit current occurring upon an external input was concentrated to an area near the positive electrode current collector where electrical resistance was low. It is considered that the presence of a microcapsule in the positive electrode active material layer did not efficiently mitigate short-circuit current.

Examples 1 to 7

In Examples 1 to 7, both a low electrical resistance during normal use and a high electrical resistance at the time or an external input were obtained. It is considered that, during normal use, the metal film included in the metal-covered microcapsule formed an electron conduction path. It is considered that, upon an external input, expansion of the microcapsule broke the, metal film and cut an electron conduction path.

In Examples 1 to 3, the following tendency was observed: the average particle size (R) was 15 μm or smaller and thereby the temperature measured after 20 seconds was low. This may be because the smaller the microcapsule is, the more promptly the expanding behavior is exhibited.

In Example 4 to 6, the following tendency was observed; the ratio (R/T) was 100 or lower and thereby the battery resistance was low. It is considered that the rotatively thick metal film makes it easy for electron conduction paths to form.

Example 7 (metal material=Pt) and Example 1 (metal material=Al) exhibited substantially the same performance. Therefore, it is considered that the metal material of the metal film may include at least one selected from the group consisting of Al and Pt. Moreover, use of a metal material that does not undergo ionization at an electric potential of the positive electrode during charge (ranging from 4.0 V vs. $Li/Li^+$ to 4.5 V vs. $Li/Li^+$) may produce similar results.

The embodiments and examples disclosed herein are, illustrative and non-restrictive in any respect. The technical scope indicated by the claims encompasses any modifications within the scope and meaning equivalent to the terms of the claims.

What is claimed is:

1. A non-aqueous electrolyte secondary battery comprising:
an electrode current collector;
an intermediate layer; and
an electrode active material layer,
the intermediate layer being interposed between the electrode current collector and the electrode active material layer and the intermediate layer contacting the electrode current collector and the electrode active material layer,
the intermediate layer consisting essentially of from 1 mass % to 20 mass % of a binder and the remainder of a metal-covered microcapsule,
the metal-covered microcapsule including a microcapsule and a metal film,
the microcapsule including a core and a shell,
the shell surrounding the core,
the core including a volatile material comprising a liquid having a boiling temperature in a range of from 70° C. to 135° C.,
the shell including a thermoplastic resin material,
the metal film covering at least part of an outer surface of the shell of the microcapsule.

2. The non-aqueous electrolyte secondary battery according to claim 1, wherein the microcapsule has an average particle size of 15 µm or smaller.

3. The non-aqueous electrolyte secondary battery according to claim 1, wherein a ratio of an average particle size of the microcapsule to an average thickness of the metal film is 100 or lower.

4. The non-aqueous electrolyte secondary battery according to claim 1, wherein the volatile material includes at least one selected from the group consisting of hexane, heptane, and octane.

5. The non-aqueous electrolyte secondary battery according to claim 1, wherein a ratio of an average particle size of the microcapsule to an average thickness of the metal film is 180 or lower and 10 or higher.

6. The non-aqueous electrolyte secondary battery according to claim 1, wherein a thickness of the metal film is 0.05 µm or greater.

7. The non-aqueous electrolyte secondary battery according to claim 1, wherein the metal film comprises a metal selected from the group consisting of aluminum and platinum.

8. The non-aqueous electrolyte secondary battery according to claim 1, wherein the metal film covers substantially the entire outer surface of the microcapsule.

9. The non-aqueous electrolyte secondary battery according to claim 1, further comprising a separator, wherein the active material layer is disposed between the intermediate layer and the separator.

10. The non-aqueous electrolyte secondary batter according to claim 1, wherein the intermediate layer is disposed on a surface of the current collector and the positive electrode active material is disposed on a surface of the intermediate layer.

11. The non-aqueous electrolyte secondary battery according to claim 1, wherein:
the electrode current collector is a positive electrode current collector;
the electrode active material layer is a positive electrode active material layer;
the intermediate layer is disposed between the positive electrode current collector and the positive active material layer; and
the non-aqueous electrolyte secondary battery further comprises:
a negative electrode current collector;
a negative electrode active material layer; and
a separator disposed between the negative electrode active material layer and the positive electrode active material layer.

12. The non-aqueous electrolyte secondary battery according to claim 1, wherein:
the electrode current collector is a negative electrode current collector;
the electrode active material layer is a negative electrode active material layer;
the intermediate layer is disposed between the negative electrode current collector and the negative active material layer; and
the non-aqueous electrolyte secondary battery further comprises:
a positive electrode current collector;
a positive electrode active material layer; and
a separator disposed between the negative electrode active material layer and the positive electrode active material layer.

13. The non-aqueous electrolyte secondary battery according to claim 1, wherein the intermediate layer consists of from 1 mass % to 20 mass % of the binder and the remainder of the metal-covered microcapsule.

* * * * *